(12) United States Patent
Lanza

(10) Patent No.: US 9,919,639 B1
(45) Date of Patent: Mar. 20, 2018

(54) EXPANDABLE LIGHTWEIGHT CAMPER OR TRAILER

(71) Applicant: Marc Lanza, Ball Ground, GA (US)

(72) Inventor: Marc Lanza, Ball Ground, GA (US)

( * ) Notice: Subject to any disclaimer, the term of this patent is extended or adjusted under 35 U.S.C. 154(b) by 127 days.

(21) Appl. No.: 15/132,355

(22) Filed: Apr. 19, 2016

(51) Int. Cl.
| | | |
|---|---|---|
| *B60P 3/32* | (2006.01) | |
| *B62D 29/04* | (2006.01) | |
| *B62D 33/04* | (2006.01) | |

(52) U.S. Cl.
CPC ............. *B60P 3/32* (2013.01); *B62D 29/045* (2013.01); *B62D 33/046* (2013.01)

(58) Field of Classification Search
CPC ....... B60P 3/32; B62D 33/046; B62D 33/048; B62D 29/045
USPC ............................. 296/181.6, 186.1, 156, 168
See application file for complete search history.

(56) References Cited

U.S. PATENT DOCUMENTS

| | | | |
|---|---|---|---|
| D159,326 S | 7/1950 | Eldridge | |
| 2,730,772 A | 1/1956 | Jones | |
| 3,288,517 A | 11/1966 | Bender | |
| 3,733,102 A | 5/1973 | Cwik | |
| 3,773,195 A * | 11/1973 | Honea | B60P 3/1041 |
| | | | 193/35 SS |
| 4,542,933 A * | 9/1985 | Bischoff | B60P 3/32 |
| | | | 296/164 |
| 4,858,986 A | 8/1989 | Whitley | |
| 7,488,030 B2 | 2/2009 | Nadeau | |
| 8,082,698 B2 | 12/2011 | Drake | |
| 2012/0285000 A1* | 11/2012 | Leibman | B62D 33/048 |
| | | | 29/527.1 |
| 2013/0207413 A1* | 8/2013 | Lookebill | B62D 33/048 |
| | | | 296/182.1 |
| 2016/0185395 A1* | 6/2016 | Osten | B32B 37/1027 |
| | | | 296/181.2 |

FOREIGN PATENT DOCUMENTS

WO          2014096445 A1    6/2014

* cited by examiner

*Primary Examiner* — Jason S Morrow
(74) *Attorney, Agent, or Firm* — Kyle A. Fletcher, Esq.

(57) ABSTRACT

The lightweight camper or trailer is a light weight shelter is adapted for use as an outdoor shelter. The lightweight camper or trailer is adapted to be portable. The lightweight camper or trailer comprises a plurality of surfaces. The each of the plurality of surfaces combine to create a protected space. Each of the plurality of surfaces is held in position through the use of a lightweight frame. The lightweight camper or trailer is made of materials light enough that the lightweight camper or trailer can be moved manually. In another potential embodiment, the lightweight camper or trailer is mounted on a commercially available trailer for transport. In an alternate potential embodiment, the plurality of surfaces is built such that the protected space will float on a body of water. The lightweight camper or trailer comprises a plurality of surfaces and a frame.

17 Claims, 4 Drawing Sheets

EXPANDABLE LIGHTWEIGHT CAMPER OR TRAILER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of buildings and like structures for specific purposes, more specifically, a transportable shelter unit.

SUMMARY OF INVENTION

The lightweight camper or trailer is a light weight shelter that is adapted for use as an outdoor shelter. The lightweight camper or trailer is adapted to be portable. The lightweight camper or trailer comprises a plurality of surfaces. The each of the plurality of surfaces combine to create a protected space. Each of the plurality of surfaces is held in position through the use of a lightweight frame. The lightweight camper or trailer is made of materials light enough that the lightweight camper or trailer can be moved manually. In another potential embodiment of this disclosure, the lightweight camper or trailer is mounted on a commercially available trailer for transport. In an alternate potential embodiment of the disclosure, the plurality of surfaces are built such that the protected space will float on a body of water.

These together with additional objects, features and advantages of the lightweight camper or trailer will be readily apparent to those of ordinary skill in the art upon reading the following detailed description of the presently preferred, but nonetheless illustrative, embodiments when taken in conjunction with the accompanying drawings.

In this respect, before explaining the current embodiments of the lightweight camper or trailer in detail, it is to be understood that the lightweight camper or trailer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lightweight camper or trailer.

It is therefore important that the claims be regarded as including such equivalent construction insofar as they do not depart from the spirit and scope of the lightweight camper or trailer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
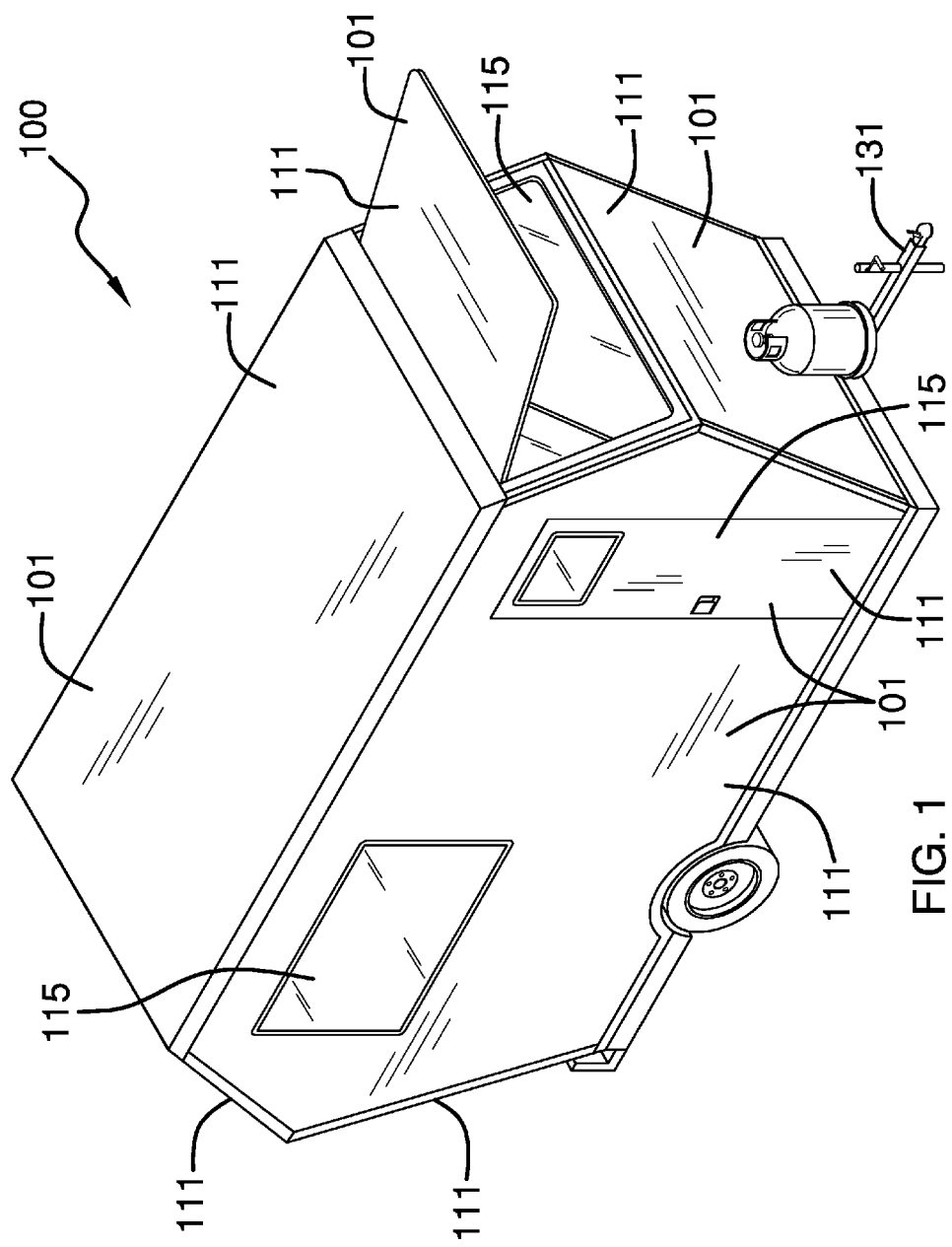
FIG. 1 is a perspective view of an embodiment of the disclosure.
Figure 2:
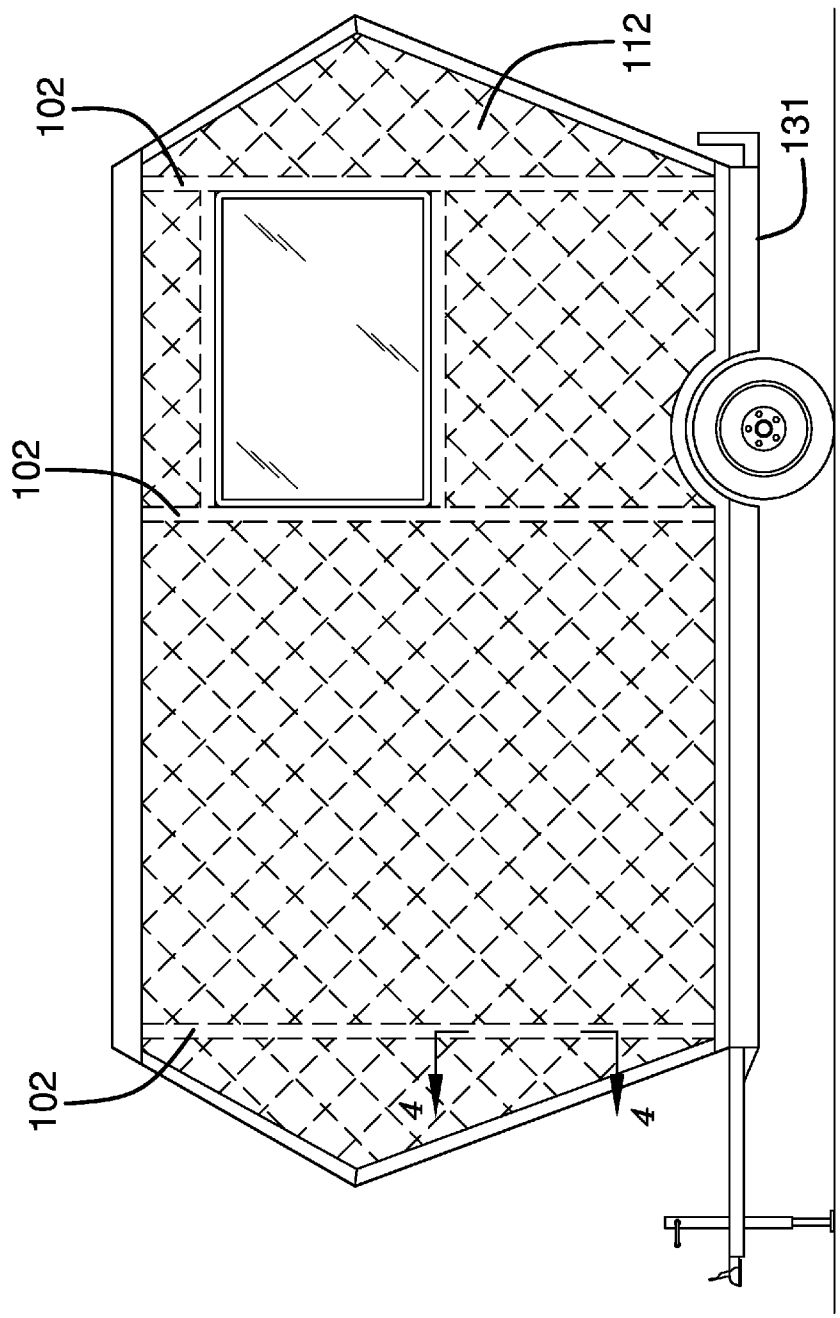
FIG. 2 is a side view of an embodiment of the disclosure.
Figure 4:
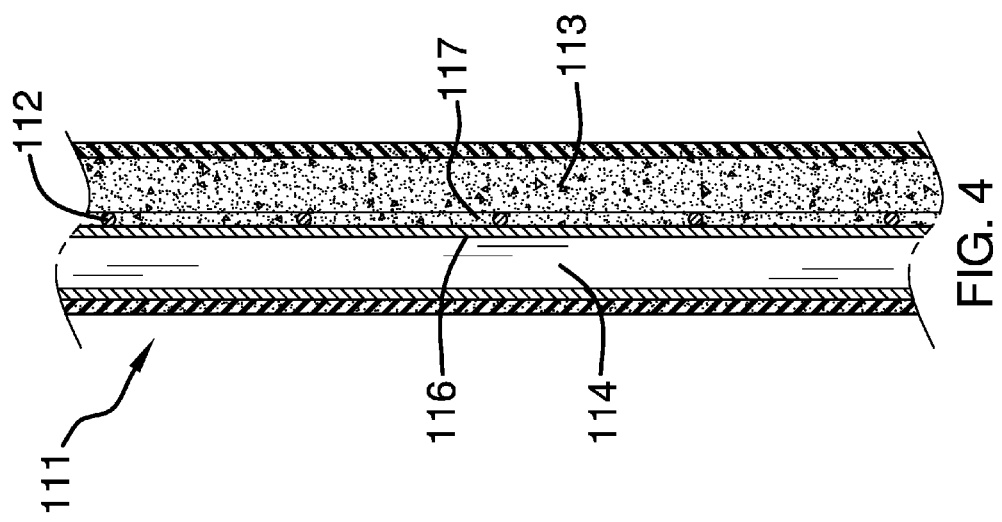
FIG. 4 is a cross-sectional view of an embodiment of the disclosure across 4-4 as shown in FIG. 2.
Figure 3:
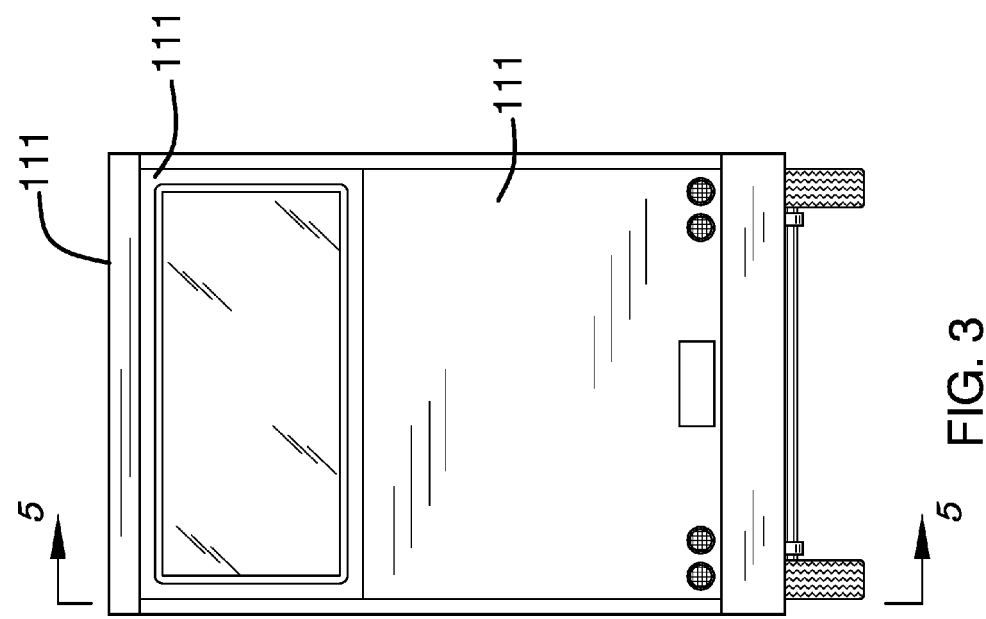
FIG. 3 is a rear view of an embodiment of the disclosure.
Figure 5:
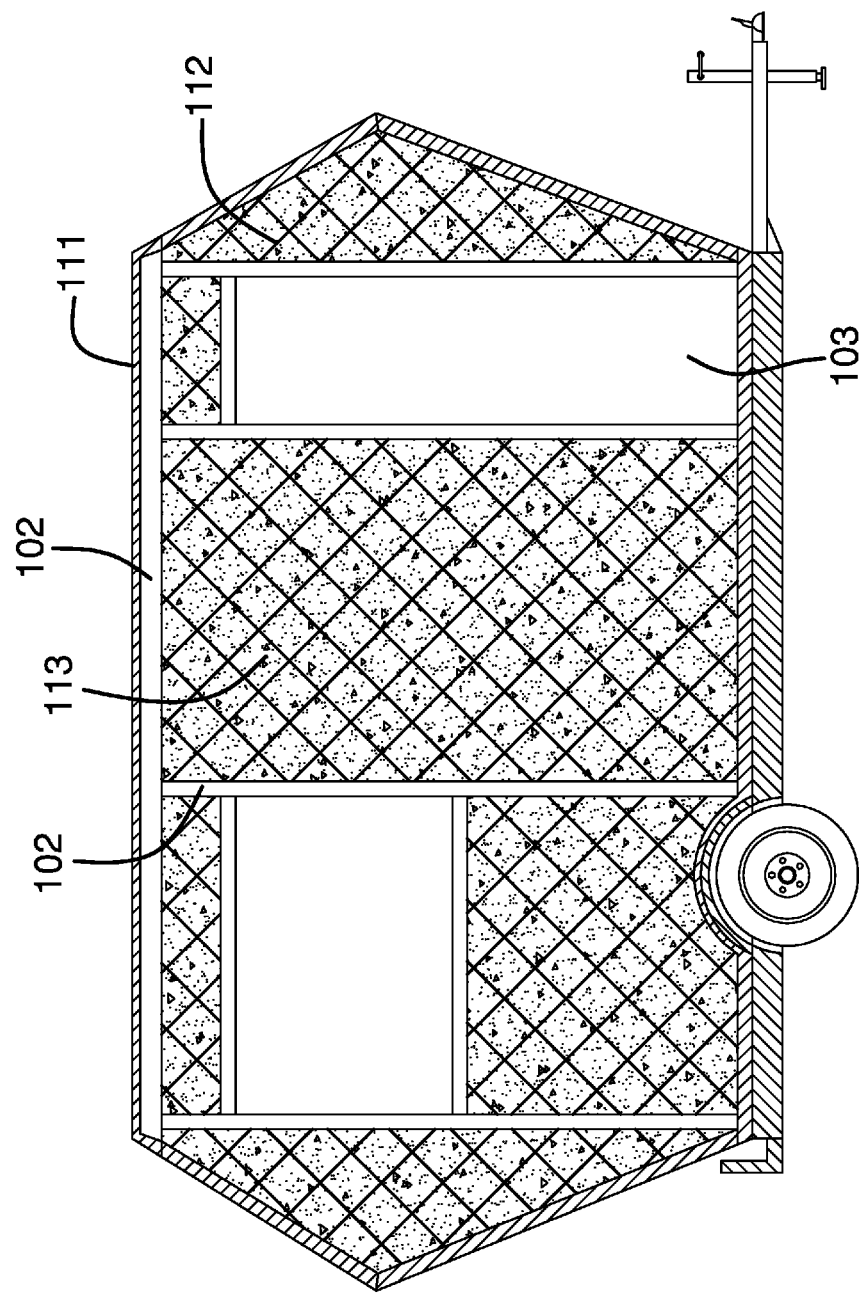
FIG. 5 is a cross-sectional view of an embodiment of the disclosure across 5-5 as shown in FIG. 3.

Detailed reference will now be made to a first potential embodiment of the disclosure, which is illustrated in FIGS. 1 through 5.

The lightweight camper or trailer 100 (hereinafter invention) comprises a plurality of surfaces 101 and a frame 102. The invention 100 is a light weight shelter that is adapted for use as an outdoor shelter. The invention 100 is adapted to be portable. The invention 100 comprises a plurality of surfaces 101. The each of the plurality of surfaces 101 combine to enclose and create a protected space 103. Each of the plurality of surfaces 101 is held in position through the use of a lightweight frame 102. The invention 100 is made of materials light enough that the invention 100 can be moved manually. In another potential embodiment of this disclosure, the invention 100 is mounted on a commercially available trailer 131 for transport. In an alternate potential embodiment of the disclosure, the plurality of surfaces 101 is built such that the protected space 103 will float on a body of water.

The plurality of surfaces 101 comprises a collection of individual surfaces 111. Each individual surface 111 forms a wall that segregates the protected space 103 from the environment. Each individual surface 111 further comprises a wire mesh 112, an interior plate 113, and an exterior plate 114. The wire mesh 112 is a readily and commercially wire mesh 112. The wire mesh is further defined with a first face 116 and a second face 117. Suitable wire mesh includes, but is not limited to, what is commonly referred to a chicken wire or poultry netting. The interior plate 113 is the surface of the individual surface that faces the protected space 103. The exterior plate 1114 is the surface of the individual surface 111 that is on the opposite side of the wire mesh 112.

The interior plate 113 is a formed from a solid foam like material. The exterior plate 114 is formed from a solid foam like material. Suitable foam like materials include, but are not limited to, polystyrene foam sheets, polyurethane foam sheets or neoprene. In the first potential embodiment of the disclosure, the exterior plate 114 is formed from polyurethane foam and the interior plate 113 is formed from a neoprene foam. As shown most clearly in FIG. 4, the individual surface 111 is formed by attaching the exterior plate 114 to the first face 116 of the wire mesh 112 and attaching the interior plate 113 to the second face 117 of the wire mesh 112 such that the wire mesh 112 is enclosed within the interior plate 113 and the exterior plate 114.

The frame 102 is the physical structure upon which each of the plurality of surfaces 101 is mounted and supported. The frame 102 defines the basic structure and shape of the protected space 103 and also defines the locations of one or more portals 115 into and out of the protected space 103 which will perform the structure of doors and windows. The form factor of each of the plurality of surfaces 101 is individually determined such that each individual surface 111 will fit precisely in its designated location. A commercially available hinge is used to attach an individual surface 111 to the frame 102 when the individual surface 111 is intended to cover a portal into or out of the protected space 103. The use of a hinge allows the individual surface 111 to be rotated in such a manner that access to the protected space 103 can be blocked or cleared. The individual surfaces 111 remaining in the plurality of surfaces 101 can be attached to the frame 102 using several methods including, but not limited to, brazing the wire mesh 112 to the frame 102 or through the use of commercially available hardware.

In the first potential embodiment of the disclosure, the frame 102 is formed form aluminum tubing.

In the first potential embodiment of this disclosure, a structure built as described above that creates a protected space 103 that is 215 cm×160 cm×215 cm in volume, weighs less than 50 kg and can be readily moved an individual. In a second potential embodiment of the disclosure, the invention 100 is mounted on a trailer 131 that allows for ready transport of the invention 100 by vehicle. Methods to mount structures on trailers 131 are well known and documented in the mechanical arts. In the third potential embodiment of the disclosure, the form factor of the protected space is designed such that the invention 100 will displace enough water to float when an occupant is in the protected space 103.

In a fourth potential embodiment, the exterior plate 114 is coated in a polyurethane coating to weather proof the invention 100.

The following definitions were used in this disclosure:

Foam: As used in this disclosure, foam is a mass of gas filled spaces, commonly referred to as bubbles, which can be formed: 1) on or in a liquid or gel; or, 2) in a solid material.

Form Factor: As used in this disclosure, the term form factor refers to the size and shape of an object.

Mesh: As used in this disclosure, the term mesh refers to an openwork structure made from threads, yarns, cords, wires, or lines that are woven, knotted, or otherwise twisted or intertwined at regular intervals. Synonyms for mesh include net.

Plate: As used in this disclosure, a plate is a smooth, flat and semi-rigid object that has at least one dimension that: 1) is of uniform thickness; and 2) that appears thin relative to the other dimensions of the object. Plates often have a rectangular or disk like appearance. As defined in this disclosure, plates may be made of any material.

Trailer: As used in this disclosure, a trailer is an unpowered wheeled vehicle that is towed by a powered vehicle.

Vehicle: As used in this disclosure, a vehicle is a device that is used transporting carrying passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A sheltered space comprising:
a plurality of surfaces and a frame;
wherein the sheltered space is adapted for use as an outdoor shelter;
wherein the sheltered space is portable;
wherein each of the plurality of surfaces combine to enclose and create a protected space;
wherein each of the plurality of surfaces is attached to the frame;
wherein the plurality of surfaces comprises a collection of individual surfaces;
wherein each individual surface is a wall that segregates the protected space;
wherein each individual surface comprises a wire mesh, an interior plate, and an exterior plate;
wherein the wire mesh is further defined with a first face and a second face.

2. The sheltered space according to claim 1 wherein the interior plate is formed form a solid foam material.

3. The sheltered space according to claim 2 wherein the exterior plate is formed form a solid foam material.

4. The sheltered space according to claim 3 wherein the exterior plate is attached to the first face of the wire mesh.

5. The sheltered space according to claim 4 wherein the interior plate is attached to the second face of the wire mesh.

6. The sheltered space according to claim 5 wherein the frame is a physical structure upon which each of the plurality of surfaces are mounted.

7. The sheltered space according to claim 6 wherein the frame further comprises one or more portals.

8. The sheltered space according to claim 7 wherein the form factor of each of the plurality of surfaces is individually determined such that each individual surface will fit in a designated location of the frame.

9. The sheltered space according to claim 8 wherein the exterior plate is formed from polyurethane.

10. The sheltered space according to claim 9 wherein the interior plate is formed from a neoprene.

11. The sheltered space according to claim 10 wherein the frame is formed from aluminum tubing.

12. The sheltered space according to claim 11 wherein the exterior plate 114 further comprises a polyurethane coating.

13. The sheltered space according to claim 12 wherein the sheltered space will float.

14. The sheltered space according to claim 12 wherein the sheltered space is mounted on a trailer.

15. The sheltered space according to claim 12 wherein the sheltered space has exterior dimensions greater than 215 cm×160 cm×215 cm.

16. The sheltered space according to claim 12 wherein the weight of the sheltered space is less than 60 kg.

17. The sheltered space according to claim 15 wherein the weight of the sheltered space is less than 60 kg.

\* \* \* \* \*